(No Model.)

W. CONLEY.
LAWN RAKE.

No. 308,751. Patented Dec. 2, 1884.

WITNESSES:
Clara Sugenheim
[signature]

INVENTOR:
William Conley
By [signature]
Attorney.

UNITED STATES PATENT OFFICE.

WILLIAM CONLEY, OF CEDARVILLE, OHIO.

LAWN-RAKE.

SPECIFICATION forming part of Letters Patent No. 308,751, dated December 2, 1884.

Application filed May 9, 1884. (No model.)

*To all whom it may concern:*

Be it known that I, WILLIAM CONLEY, of Cedarville, in the county of Greene and State of Ohio, have invented a new and useful Improvement in Lawn-Rakes, which improvement is fully set forth in the following specification and accompanying drawings, in which—

Figure 1:
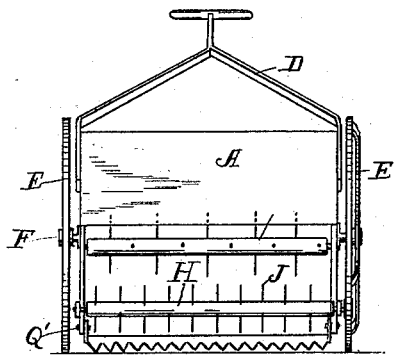
Figure 2:
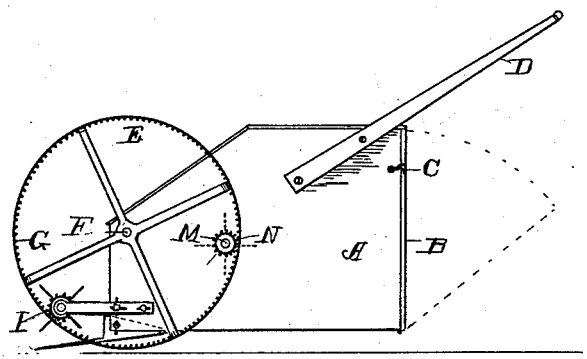
Figure 3:
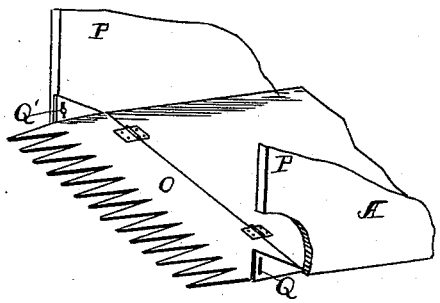
Figure 4:
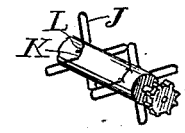

Figure 1 is a front view of my improved lawn-rake. Fig. 2 is a side view of the same; Fig. 3, an enlarged perspective view of the hinged tooth-bar, and Fig. 4 a perspective view of the revolving rake.

The present invention relates to an improvement in lawn-rakes to take up the fine lawn-grass and deposit the same in a box; and it consists of a body having handles attached thereto for propelling the same, the forward end having a pair of drive-wheels, one of which meshes with a pair of revolving rakes. One of said revolving rakes, working over a transverse toothed bar, throws the grass rearwardly into the body, all of which will now be fully set forth in detail.

In the accompanying drawings, A is a box or body of suitable form, preferably rectangular in form. The rear end piece, B, is designed to be hinged at the bottom, and provided with hooks C at the top for securing the same in position. From the rear end upwardly extend a pair of handles, D, for propelling the device. The forward end of the body is provided with a pair of drive-wheels, E, secured to an axle, F, journaled through the body. One of said wheels E is geared internally, as at G, to a transverse shaft, H, journaled transversely at the forward end of the body, and having a pinion, I, at one end meshing in the gear of the drive-wheel E. The periphery of this shaft is provided with a series of teeth formed of a continuous piece of wire bent so as to form a series of arms, J, radiating outwardly from the center. The inner curves, K, of the loop are secured on the shaft by means of staples L. A second transverse shaft, M, journaled through the body slightly in the rear of the axle F, is also provided with a pinion, N, meshing in the drive-wheel E. A series of teeth are also provided on this shaft, as on the forward shaft. The forward part of the body is also provided with a hinged tooth-bar, O, having at the ends upturned flanges P. The forward ends of these flanges have slots, or a series of openings, Q, and the sides of the body have corresponding slots or openings to receive bolts or pins Q'. The tooth-bar O, being at its rear side hinged or attached to the bottom of the body, the forward side carrying the teeth may be raised or lowered, and held at any desired height by passing a pin through the said openings.

It is designed that the forward revolving rake be at such a height as not to interfere with the teeth of the rake beneath. The rearward motion of the bottom of revolving rake keeps the toothed bar clear of grass, while the revolution of the rear shaft, M, carrying the teeth, materially assists in conveying the cut grass rearwardly into the body of the device. The grass may be readily removed from the body, when full, by means of the hinged ends.

What I claim is—

1. The herein-described lawn-rake, consisting of a body supported at its forward end by a pair of wheels, a transverse shaft carrying a series of iron rakes, provided at one end with a pinion meshing in the gearing of one drive-wheel, for removing the grass rearwardly from a toothed bar, and rearwardly of the axle a second revolving rake, substantially as herein set forth.

2. The combination of the shaft with a pinion at one end, and on the periphery a series of arms formed of wire loops secured at the center by means of staples, with the toothed bar hinged at the rear side, the ends having perforated upturned flanges, the two designed to work in close juxtaposition, substantially as herein set forth.

3. The combination, in a lawn-rake, of the body having a pair of handles, the supporting-wheels, the revolving rakes engaging with one of the drive-wheels, and the toothed bar, hinged as shown, substantially as herein set forth.

In testimony that I claim the foregoing I have hereunto set my hand, this 27th day of March, 1884, in the presence of witnesses.

WILLIAM CONLEY.

Witnesses:
A. C. OWENS,
W. R. M. COOPER.